United States Patent [19]

Grote et al.

[11] 4,295,262
[45] Oct. 20, 1981

[54] METHOD OF MAKING TRUCK BED COVER ASSEMBLY

[75] Inventors: Daniel Grote, Mt. Clemens; Duane Raymond, Warren; Joseph C. Mosher, Rochester, all of Mich.

[73] Assignee: Thermoplastics, Inc., Prairie View, Tex.

[21] Appl. No.: 132,509

[22] Filed: Mar. 21, 1980

[51] Int. Cl.³ .................. B23P 19/00; B23P 25/00
[52] U.S. Cl. ................... 29/462; 29/281.1; 29/559; 83/455; 269/69; 269/87.1; 409/178; 296/156
[58] Field of Search ............... 29/281.1, 428, 462, 29/559, 445, 407; 83/523, 529, 455; 296/156; 269/69, 71, 87.1, 290, 297; 409/178

[56] References Cited

U.S. PATENT DOCUMENTS

| | | | |
|---|---|---|---|
| 1,424,050 | 7/1922 | Thomas et al. | 83/455 |
| 2,114,150 | 4/1938 | Rodman | 29/428 X |
| 2,301,636 | 11/1942 | Nicol | 269/69 |
| 2,311,042 | 2/1943 | Ferguson | 269/297 X |
| 2,459,080 | 1/1949 | Killius | 269/71 |
| 2,634,494 | 4/1953 | Powers | 29/462 X |
| 2,651,333 | 9/1953 | Spinney | 269/290 X |
| 2,935,314 | 5/1960 | Ford | 269/290 X |
| 2,967,053 | 1/1961 | Nowak | 269/87.1 |
| 3,195,340 | 7/1965 | Zunich | 83/455 X |
| 3,494,394 | 2/1970 | Stock | 409/178 |

FOREIGN PATENT DOCUMENTS 9970 of 1909 United Kingdom ................ 29/462

Primary Examiner—Charlie T. Moon
Attorney, Agent, or Firm—Wallenstein, Wagner, Hattis, Strampel & Aubel

[57] ABSTRACT

An assembly for the production of covers, or toppers, for the truck beds of various sizes and makes of pick-up trucks comprising a preformed shell which serves as a base or body portion for the finished cover, and a support member for the preformed shell which provides means for trimming the shell to a predetermined length and enables the shell to be maintained in a fixed position during fabrication of the completed cover. The preformed shell has an initial length greater than that of the finished cover, and, together with the support member, provides a simple, effective and efficient means for making covers for at least eleven different models and makes of pick-up trucks.

3 Claims, 9 Drawing Figures

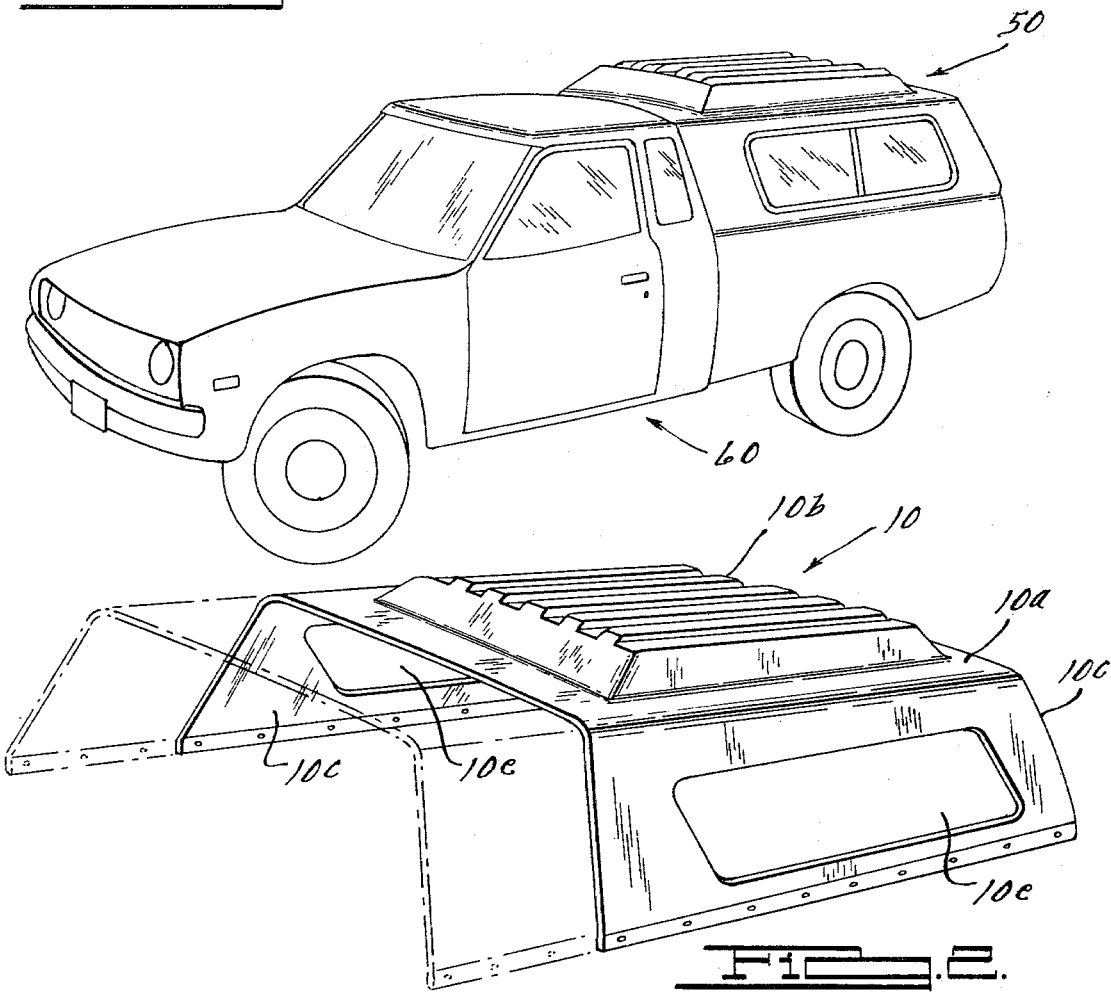
Fig. 1.
Fig. 2.
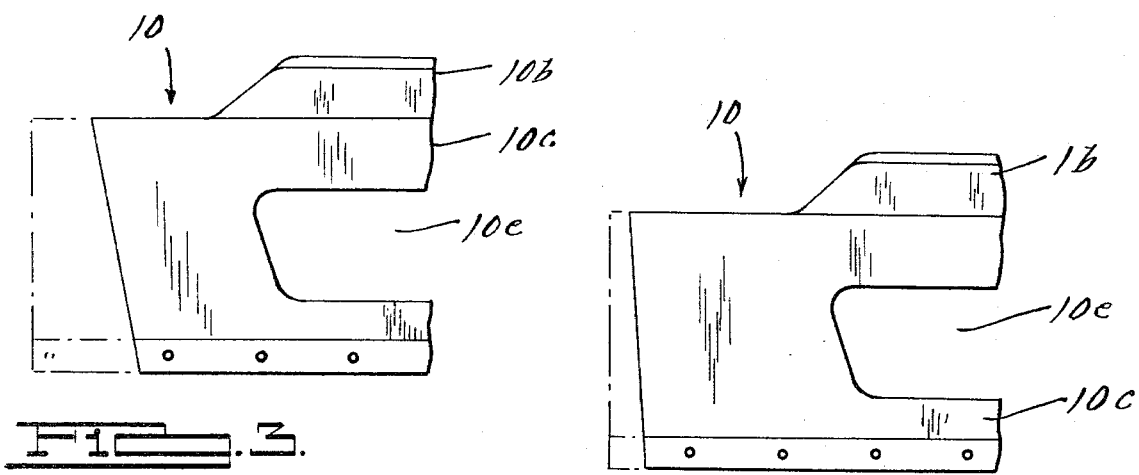
Fig. 3.
Fig. 4.

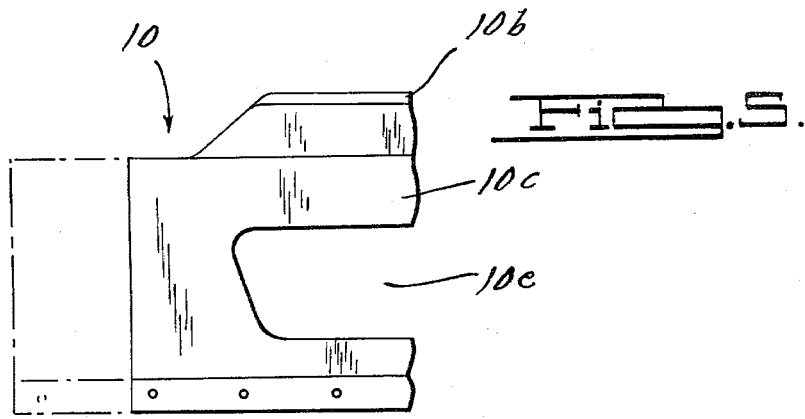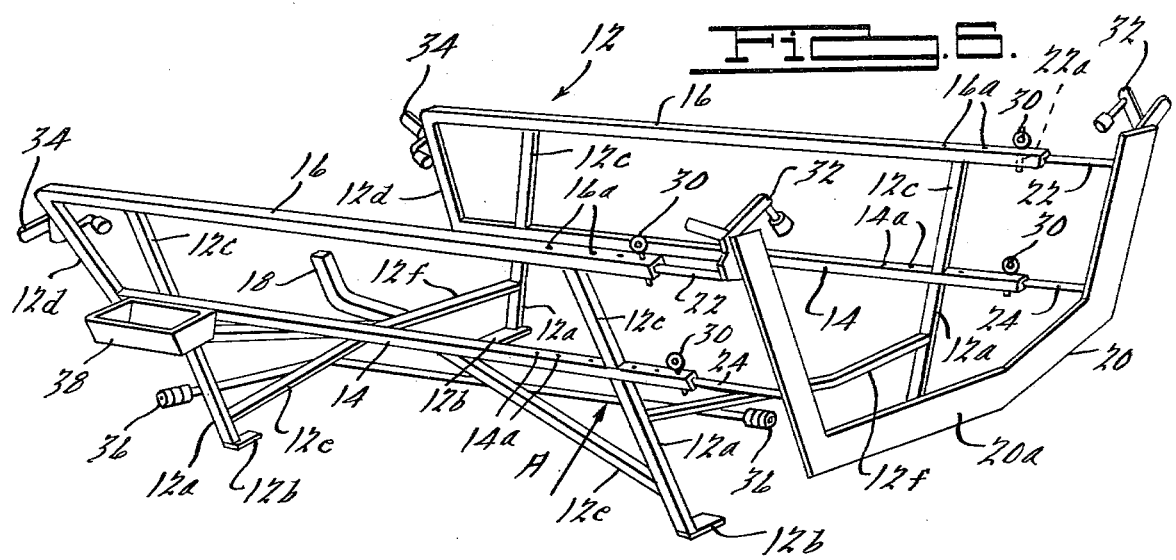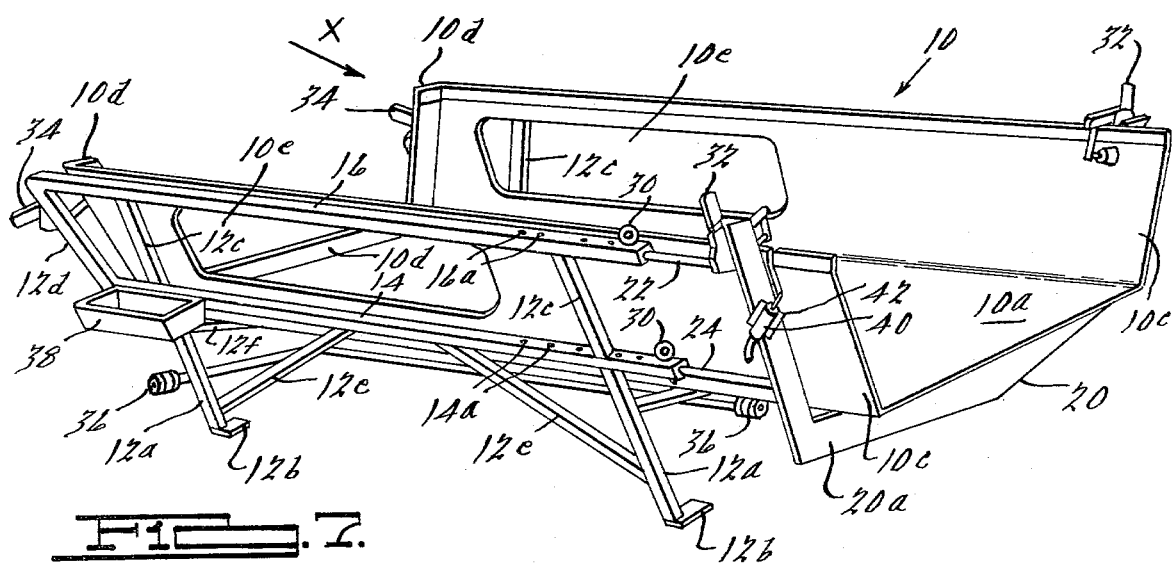

METHOD OF MAKING TRUCK BED COVER ASSEMBLY

The present invention relates to covers, or toppers, for converting a conventional, working pick-up truck into a recreational-type vehicle.

Heretofore, in the main, due to variances in pick-up truck bed lengths and the contours of the rear of the pick-up truck cab, it has been the practice of manufacturers of covers, or toppers, for the beds of pick-up trucks to form or mold each cover, or topper, to meet the size requirements of the particular make of pick-up truck on which the cover, or topper, was intended to be used. This practice has necessitated that the manufacturer have a different forming unit, or mold, for each cover, or topper, to meet the specifications of each of the various models and makes of pick-up trucks. The increased costs, especially from the standpoint of the substantial equipment outlays, incurred by these manufacturers are, of course, unfortunately, reflected in the ultimate cost of the covers, or toppers, to the purchaser.

In accordance with the present invention, an assembly, and method, for producing covers, or toppers, for pick-up trucks has been evolved which eliminates the need for more than one cover, or topper, forming unit, or mold, to meet the bed size specifications of each pick-up truck manufacturer. The resulting substantial reduction in equipment costs are achieved, moreover, while providing a much simpler, more effective and more efficient means for producing covers, or toppers, for use on at least eleven different models and makes of pick-up trucks including those manufactured by Chrysler Corporation, Toyota, Datsun, Ford and General Motors.

The invention, in one of its aspects, comprises an assembly which includes a one-piece, unitary, preformed shell, or body portion, having the general configuration of the cover, or topper, to be made therefrom, but having an initial length which is greater than the length of the completed cover, or topper. The assembly further includes a support member for receiving and maintaining the preformed shell in a predetermined fixed position. The support member has adjustable guide means which is movable along the longitudinal axis of the preformed shell. The guide means is adapted to be selectively positioned with relation to the leading edge of the preformed shell to provide a line of demarcation for enabling the preformed shell to be trimmed to the proper length and at an angle to conform the resulting trimmed edge substantially to the contours of the rear of the cab of the pick-up truck on which it is to be used. The support member further is provided with releasable locking means for the guide means, and for securing the preformed shell in a fixed position on the support member. In addition, indicia advantageously may be located along the support member to aid operating personnel in the proper placement of the functional as well as decorative features which characterize and distinguish the cover, or topper, for each model and make of pick-up truck, and coordinate it with the truck manufacturer's decor, or color scheme, for each such model and make. The assembly enables a cover, or topper, to be completed with a minimum number of operating personnel, with a minimum of effort, and at an appreciable savings in time.

The foregoing, and other features and advantages of the invention will become apparent from the following description taken in conjunction with the accompanying drawings wherein:

FIG. 1 is a view in perspective of a pick-up truck having a cover, or topper, produced in accordance with the teachings of the present invention mounted over the bed thereof;

FIG. 2 is a view in perspective of an embodiment of the preformed shell used in the production of a cover, or topper, showing in broken lines the initial overall length of the shell;

FIGS. 3, 4 and 5 are fragmentary side views in elevation showing the angles at which the preformed shell is trimmed in order to provide a cover, or topper, or the proper length, and to conform the leading edge of the finished cover, or topper, to the contours of the rear of the cab of the truck on which the cover, or topper, is to be used;

FIG. 6 is a view in perspective of an embodiment of the support member comprising the assembly of the present invention;

FIG. 7 is a view in perspective of the embodiment of the support member illustrated in FIG. 6 with the preformed shell positioned thereon ready for trimming;

Figure 8:
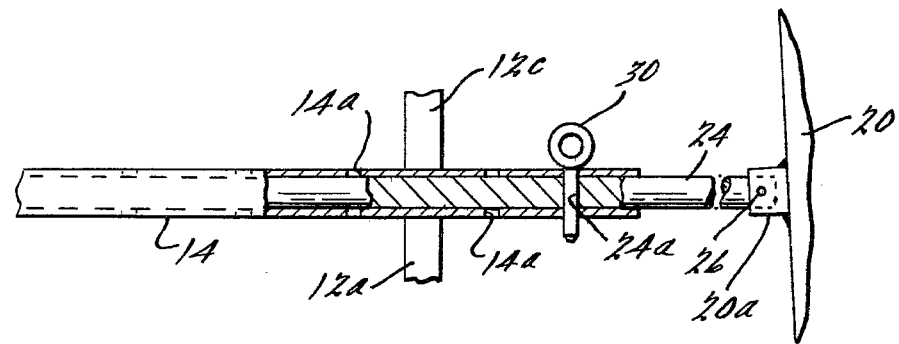
FIG. 8 is a fragmentary view partly in section as viewed along line "A" of FIG. 6.
Figure 9:
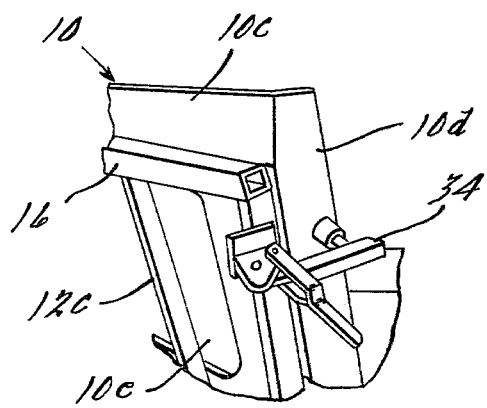
FIG. 9 is a fragmentary view in perspective as viewed along line "X" of FIG. 7.

Referring, now, to FIGS. 6 and 7 of the drawings, the embodiment of the assembly illustrated comprises a one-piece, unitary, preformed shell 10 and a support member 12. The one-piece shell 10 advantageously is formed from a sheet of a plastic material into the desired shape and size by thermoforming. The preferred sheet material is formed of an ABS resin or polymer. It should be understood, of course, that other forming techniques such as injection molding or compression molding, as well as other resins such as polyethylene and styrene polymers, can be used in the fabrication of the one-piece shell 10.

As best shown in FIG. 2, the shell 10 comprises a top wall 10a, having an offset, centrally located scalloped or ribbed dome portion 10b, and sidewalls 10c—10c joined to the longitudinal margins of the top wall 10a. The rear margins of the top wall and the sidewalls extend inwardly to form a continuous flange 10d at the back of the shell. The flange 10d provides a base for securing the frame of the rear door of the cover, or topper, to the shell 10. The sidewalls 10c—10c are each formed with an elongated opening 10e for receiving window frames and sliding windows. The leading ends of the top wall 10a and the sidewalls 10c—10c are elongated to provide an adequate area at the front of the shell 10 to enable the shell to be trimmed to a preselected length.

As best illustrated in FIG. 6, the support member 12 of the assembly comprises a self-supporting metal framework having two pairs of legs 12a—12a each provided with a foot-plate 12b for anchoring the support member to a supporting surface such as a floor, or for hinging the support member to such a surface to facilitate removal of a cover, or topper, from the support member. The legs 12a—12a extend upwardly and outwardly from their associated foot-plate 12b, and are joined at their upper ends to a pair of horizontal, hollow channel members 14—14. A second pair of horizontal, hollow channel member 16—16 is secured in spaced, substantially parallel relation to the members 14—14 by struts 12c which act as extensions of the legs 12a. Struts 12d are provided at the rear ends of the members 14—14 and 16—16. The entire framework is reinforced by upwardly inclined struts 12e which are joined to the legs 12a—12a and the members 14—14, and transverse struts 12f which are joined to the lower ends of the legs 12a—12a. A stop member 18, adapted to engage the back of the top wall 10a of the shell 10, is secured to the center of the rearwardmost of the transverse struts 12f.

In the preferred embodiment of the support member 12 illustrated, an adjustable guide member or trim plate 20 is slidably engaged on the leading ends of the hollow members 14—14 and 16—16 by a pair of upper tubular members 22—22 and a pair of lower tubular members 24—24. As best shown in FIG. 8, the trim plate 20 is provided with sockets 20a in which the leading ends of the tubular members 22—22 and 24—24 are pivotally engaged by a pin 26. The trim plate 20 has a configuration conforming generally to the cross-sectional configuration of the shell 10, and provides a plane surface 20b, the purpose of which will become clear as the description proceeds.

As illustrated in FIGS. 6, 7 and 8, the channel members 14—14 and 16—16 are each provided with a plurality of predeterminedly spaced openings or holes 14a and 16a, respectively, therethrough. The holes 14a and 16a are in register with a hole 22a and a hole 24a, respectively, in the upper and lower tubular members 22—22 and 24—24. Locking pins 30, adapted to be received in the holes in the channel members and the tubular members when they are in register, are provided to maintain the trim plate 20 in a preselected position during trimming of the shell 10. In order to maintain the shell 10 in a fixed position on the support member 12, a pair of front locking clamps 32—32 advantageously are carried on the upper tubular members 22—22, and a pair of rear locking clamps 34—34 are carried on the struts 12d at the back of the support member 12. As an optional feature, the support member 12 can be provided with piping and air hose connections 36 to enable an operator to use pneumatically operated tools during the fabrication of a cover, or topper. As an added convenience, parts trays 38 desirably are attached to the channel members 14—14.

In utilizing the assembly to produce a cover, or topper, for a particular model and make of a pick-up truck, the preformed shell 10 first is positioned on the support member 12 with the top wall 10a down, or, stated differently, in an inverted position. When the shell 10 is properly positioned on the support member 12, the flange 10d along the rear margin of the top wall 10 of the shell 10 will abut the stop member 18. The rear locking clamps 34 are then engaged to firmly hold the back of the sidewalls 10c—10c against the channel members 16—16. While the locking pins 30 are in a neutral or inoperative position, the trim plate 20 is moved to a preselected distance from the leading edge of the shell 10. The pins 30 are then engaged in the holes 14a and 16a in the channel members 14—14 and 16—16 which are in register with the holes 22a and 24a in the tubular members 22—22 and 24—24. In this connection, it should be pointed out that, in those instances where the trimmed edge of the shell 10 is required to be angled to enable the front end of the completed cover, or topper, to conform to the particular contours of the cab of a pick-up truck, the lower end of the trim plate 20 will not be extended as far forwardly as the upper end thereof. Since the leading ends of the lower tubular members 24—24 are pivotally mounted in the sockets 20a of the trim plate 20, the trim plate 20 can pivot a sufficient distance to set the desired angle and to provide a straight line of demarcation along which the shell 10 is to be trimmed. After the locking pins 30 have been engaged to fix the trim plate 20 at the preselected point along the leading end of the shell 10, the front locking clamps 32—32 on the upper tubular members 22—22 are used to lock the forward end of the sidewalls 10c—10c against the channel members 16—16. The shell 10 is then ready to be trimmed.

As best illustrated in FIG. 6, a router 40, to which a flat plate 42 has been attached, is exemplary of a type of power tool which can be used to trim the shell 10 to the desired length. The plate 42 provides a smooth surface which can be moved along the surface 20b of the trim plate 20 to assure an evenly trimmed edge. In FIGS. 2 through 5, shells which have been trimmed at different lengths and angles are shown. The broken lines in each case represent the original length of the shell 10. The trimmed shell illustrated in FIGS. 2 and 5 is for use in the production of a cover, or topper, for the short-bed model of a LUV (GM) pick-up truck. The trimmed shell of FIG. 3 is for use in making a cover, or topper, for a short-bed Datsun pick-up truck. The trimmed shell of FIG. 4 is adapted for use in making a cover, or topper, for the long bed version of a Toyota pick-up truck. As stated above, the assembly of the present invention provides means for producing covers, or toppers, for at least eleven models and makes of pick-up trucks.

After the shell 10 has been trimmed, the completion of the cover, or topper, is carried forward while the trimmed shell is clamped to the support member 12. This procedure includes the attachment of the front panel and the rear door to the trimmed shell; the installation of window frames in the openings 10e in the sidewalls 10c—10c of the shell; the installation of rails along the bottom margins of the sidewalls 10c—10c; the attachment of a roof support rib; and the application of the necessary striping and decorative trimming. As indicated hereinabove, indicia (not shown) advantageously is provided along the channel members 14—14 and 16—16 to guide an operator preforming the various operations required in completing a cover, or topper. A typical, finished cover, or topper, 50 is shown installed on the bed of a pick-up truck 60 in FIG. 1.

While the invention has been illustrated and described in relation to a specific embodiment thereof, it should be understood that various modifications may be made in the assembly without departing from the spirit and scope of the invention.

What is claimed is:

1. A method of making a cover for a truck bed, comprising forming a shell having the general configuration of a truck bed cover and having a top wall, and sidewalls joined to the longitudinal margins of the top wall, said shell being of a length which is greater than the length of the cover to be made therefrom; positioning the shell in an inverted condition on a support member having adjustable guide means; positioning the guide means at a predetermined distance inwardly of the leading edge of the shell; trimming the shell along the guide means to provide a body portion for the truck bed cover having the length desired; and completing the assembly of the cover by securing a front panel and rear door thereto while the body portion is maintained in a fixed position on the support member.

2. A method according to claim 1 wherein the shell is releasably clamped to the support member during trimming.

3. A method according to claim 1 wherein the guide means comprises a plate member having a plane surface which extends along the top wall and the sidewalls of the shell, and the shell is trimmed to the desired length by moving a cutting tool along said surface of the guide means.

* * * * *